United States Patent
Kubo et al.

(10) Patent No.: US 7,122,594 B2
(45) Date of Patent: Oct. 17, 2006

(54) MODIFIED BLOCK COPOLYMER COMPOSITION

(75) Inventors: Nobuaki Kubo, Kawasaki (JP); Yasuhiro Kusanose, Yokohama (JP); Shigeki Takayama, Tokyo (JP); Toshinori Shiraki, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/480,201

(22) PCT Filed: Apr. 24, 2002

(86) PCT No.: PCT/JP02/04090

§ 371 (c)(1),
(2), (4) Date: Dec. 10, 2003

(87) PCT Pub. No.: WO03/091334

PCT Pub. Date: Nov. 6, 2003

(65) Prior Publication Data

US 2004/0176514 A1    Sep. 9, 2004

(51) Int. Cl.
*B60C 3/04*      (2006.01)
*C08K 5/5415*   (2006.01)

(52) U.S. Cl. .............. 524/451; 524/493; 524/494; 524/505

(58) Field of Classification Search ........... 524/451, 524/493, 494, 505
See application file for complete search history.

(56) References Cited

U.S. PATENT DOCUMENTS 4,409,357 A    10/1983    Milkovich
4,882,384 A    11/1989    Willis et al.
5,332,784 A *  7/1994    Shiraki et al. ............... 525/98

FOREIGN PATENT DOCUMENTS

| | | |
|---|---|---|
| EP | 1 245 585 | 10/1983 |
| JP | 53-10945 A | 9/1978 |
| JP | 59-131613 A | 7/1984 |
| JP | 62-54138 B2 | 11/1987 |
| JP | 62-54140 B2 | 11/1987 |
| JP | 4-28034 B2 | 5/1992 |
| JP | 4-38777 B2 | 6/1992 |
| JP | 4-39495 B2 | 6/1992 |
| JP | 7-188542 A | 7/1995 |
| JP | 10-139963 A | 5/1998 |
| JP | 11-256025 A | 9/1999 |
| JP | 2001-72853 A | 3/2001 |
| WO | WO 87/02369 A | 4/1987 |

* cited by examiner

*Primary Examiner*—Robert D. Harlan
(74) *Attorney, Agent, or Firm*—Birch, Stewart, Kolasch & Birch, LLP

(57) ABSTRACT

A modified block copolymer composition comprising (1) 100 parts by weight of a modified block copolymer consisting of vinyl aromatic hydrocarbons and conjugated dienes, containing a functional group having at least one group selected from the group consisting of a hydroxide group, an epoxy group, an amino group, a silanol group and an alkoxysilane group, or a hydrogenation product of the copolymer, and (2) 0.5 to 50 parts by weight at least one of fillers selected from the group consisting of silica-based inorganic fillers, metal oxides and metal hydroxides is disclosed. This modified block copolymer composition is excellent in heat resistance, mechanical strength, transparency, abrasion resistance, and processability.

10 Claims, No Drawings

MODIFIED BLOCK COPOLYMER COMPOSITION

TECHNICAL FIELD

The present invention relates to a thermoplastic modified block copolymer composition comprising a functional group-containing modified block copolymer comprising a vinyl aromatic hydrocarbon and a conjugated diene, or its hydrogenation product, and at least one of fillers selected from the group consisting of silica-based inorganic fillers, metal oxides, and metal hydroxides.

Background Art

Researches have been made heretofore to produce high molecular materials having a high performance and a high functionality by a polymer alloy technique combining different sorts of organic high molecular substances. For example, thermoplastic elastomer compositions which are soft materials having rubbery properties and do not require any vulcanizing process, and thermoplastic resin compositions which are excellent in molding processability and recyclability have been used in various fields including automobile parts, domestic electrical appliance parts, wire covers, medical instruments, footwear, miscellaneous goods, and the like. At present, various materials as thermoplastic elastomers and thermoplastic resins, such as polyolefins, polyurethanes, polyesters, polystyrenes and the like, have been developed and commercially available.

Among them, vinyl aromatic hydrocarbon-conjugated diene block copolymers such as styrene-butadiene block copolymers and styrene-isoprene block copolymers and the like, and their hydrogenation products (sometimes, referred to as "hydrogenated block copolymers" hereinafter) exhibit high pliability and good rubber elasticity at room temperature when they have a lower content of styrene. They are capable of producing compositions which are excellent in molding process-ability. Moreover, when they have a higher content of styrene, they can produce clear thermoplastic resins having outstanding impact-resistance so that they are useful for food packages and containers, domestic electric appliance parts, industrial parts, utensils, toys and the like.

However, functionality and characteristics achieved by using organic high molecular materials alone are limited, so an attempt has been made to overcome the limitation by using a combination of organic high molecular materials and inorganic substances depending on applications.

For example, JP59-131613A discloses an elastomeric composition having an improved permanent compression set which was produced by partially cross-linking an elastomeric composition comprising hydrogenated block copolymers, hydrocarbon oils, olefinic polymers and inorganic tillers with organic peroxides and cross-linking adjuvants. JP11-256025A discloses a resin composition excellent in electric conductivity comprising polyphenylene ether resins hydrogenated block copolymers and electroconductive inorganic tillers. Moreover, JP2001-72853A discloses an thermoplastic resin composition excellent in hygroscopic resistance and vibration damping property comprising polycarbonate resins, styrene-butadiene block copolymers and hollow ceramic particles.

However, the compositions comprising thermoplastic block copolymers and inorganic fillers have not achieved so much improvement effect in performance as desired because one of the two types of components is hydrophobic organic materials while the other is hydrophilic inorganic materials, resulting in a lower affinity with each other and poor kneadability.

In order to improve the affinity of thermoplastic block copolymers and different materials with one another, an attempt has been proposed to add functional groups to the thermoplastic block copolymers. For example, JP62-54138B and JP62-54140B disclose a composition having an improved affinity to inorganic fillers by adding maleic anhydride to block copolymers comprising vinyl aromatic hydrocarbons and conjugated dienes. Moreover, JP4-39495B, JP4-28034B and JP4-38777B disclose a composition having an improved affinity with thermoplastic resins, tackiness imparted resins and asphalt by adding functional groups to the terminals of block copolymers comprising vinyl aromatic hydrocarbons and conjugated dienes.

Under those circumstances, in conjunction with a composition comprising a vinyl aromatic hydrocarbon-conjugated diene block copolymer or its hydrogenated product and an inorganic material, there has been a demanding need to provide materials having a high performance and a high functionality which are capable of effectively exhibiting functions and characteristics of both types of components.

DISCLOSURE OF INVENTION

As a result of various researches to overcome the aforementioned problems, the present inventors have completed this invention on the basis of the findings that a composition comprising: (1) a specifically structured modified block copolymer containing specific functional group(s) or its hydrogenation products; and (2) at least one of fillers selected from the group consisting of silica-based inorganic fillers, metal oxides, and metal hydroxides; in a specific amount of each of them is excellent in thermal resistance, mechanical strength, transparency, abrasion resistance, and processability. That is, the present invention is as follows:

[1] a modified block copolymer composition comprising:

(1) a modified block copolymer consisting of a polymer block A comprising primarily a vinyl aromatic hydrocarbon and a polymer block B comprising primarily a conjugated diene, or its hydrogenation products, and (2) at least one of fillers selected from the group consisting of silica-based inorganic fillers, metal oxides and metal hydroxides, wherein the molecular chain of the component (1) has at the terminals thereof a functional group having at least one of groups selected from the group consisting of a hydroxide group, an epoxy group, an amino group, a silanol group, and an alkoxysilane group; the component (1) has a content of the vinyl aromatic hydrocarbon of 5 to 95% by weight; the amount of the component (2) is 0.5 to 50 parts by weight based on 100 parts by weight of the component (1); and the component (2) has an average particle size in a dispersion of 0.01 to 2 μm.

[2] The modified block copolymer composition according to the above [1], further comprising (3) an olefinic polymer, the amount of the component (3) being 10 to 500 parts by weight based on 100 parts by weight of the component (1).

[3] The modified block copolymer composition according to the above [1] or [2], wherein the block ratio of the vinyl aromatic hydrocarbon is not less than 50% of the whole vinyl aromatic hydrocarbon in the component (1).

[4] The modified block copolymer composition according to the above [1] or [2], wherein the component (1) is a hydrogenation product of the modified block copolymer at the hydrogenation rate of not less than 10%, and the proportion of a structural unit having a vinyl bond to the whole structural units originated from the conjugated diene in the hydrogenation products being in the range of 10 to 85%, and the proportion of a 1, 2C=C unit is not higher than 15%.

[5] The modified block copolymer composition according to the above [1] or [2], wherein the molecular chain of the component (1) has at the terminals thereof a functional group selected from the group consisting of the groups having the following formulae (1) to (14):

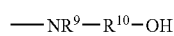 (1)

 (2)

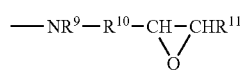 (3)

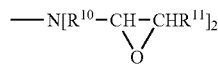 (4)

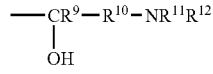 (5)

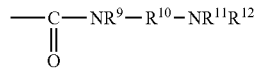 (6)

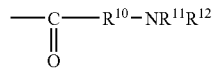 (7)

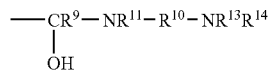 (8)

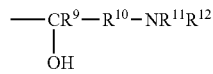 (9)

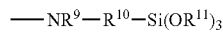 (10)

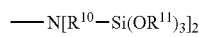 (11)

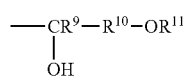 (12)

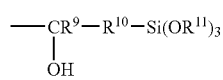 (13)

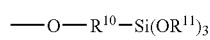 (14)

where $R^9$, $R^{12}$ to $R^{14}$ are a hydrogen, a hydrocarbon group having carbon atoms of 1 to 24, or a hydrocarbon group having a functional group selected from the group consisting of a hydroxide group, an epoxy group, an silanol group, and an alkoxysilane group and having carbon atoms of 1 to 24;

$R^{10}$ is a hydrocarbon chain having carbon atoms of 1 to 30, or a hydrocarbon chain having a functional group selected from the group consisting of a hydroxide group, an epoxy group, a silanol group, and an alkoxysilane group and having carbon atoms of 1 to 30;

hydrocarbon groups $R^9$, $R^{12}$ to $R^{14}$ and a hydrocarbon chain $R^{10}$ may have an element such as oxygen, nitrogen or silicon bonded in the bonding form other than the hydroxide group, the epoxy group, the silanol group, and the alkoxysilane group; and $R^{11}$ is a hydrogen or an alkyl group having carbon atoms of 1 to 8.

[6] The modified block copolymer composition according to the above [1] or [2], wherein the molecular chain of the component (1) has at the terminals thereof a functional group selected from the group consisting of the groups having the following formulae (1) to (9):

 (1)

 (2)

 (3)

 (4)

 (5)

 (6)

 (7)

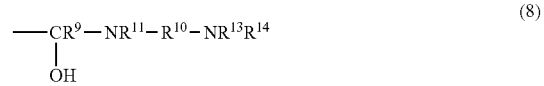 (8)

 (9)

where $R^9$, $R^{12}$ to $R^{14}$ are a hydrogen, a hydrocarbon group having carbon atoms of 1 to 24, or a hydrocarbon group having a functional group selected from the group consisting of a hydroxide group, an epoxy group, a silanol group, and an alkoxysilane group and having carbon atoms of 1 to 24;

$R^{10}$ is a hydrocarbon chain having carbon atoms of 1 to 30, or a hydrocarbon chain having a functional group selected from the group consisting of a hydroxide group, an epoxy group, a silanol group, and an alkoxysilane group and having carbon atoms of 1 to 30;

hydrocarbon groups $R^9$, $R^{12}$ to $R^{14}$ and a hydrocarbon chain $R^{10}$ may have an element such as oxygen, nitrogen or silicon bonded in the bonding form other than the hydroxide group, the epoxy group, the silanol group, and the alkoxysilane group; and $R^{11}$ is a hydrogen or an alkyl group having carbon atoms of 1 to 8.

[7] The modified block copolymer composition according to the above [1] or [2], wherein the component (2) is at least one of fillers selected from the group consisting of silica, wollastonite, montmorillonite, zeolites, alumina, titanium oxide, magnesium oxide, zinc oxide, slag wool, glass fibers, magnesium hydroxide, aluminum hydroxide, hydrated magnesium silicate, hydrated aluminum silicate, basic magnesium carbonate, and hydrotalcite.

[8] The modified block copolymer composition according to the above [1] or [2], containing a silane coupling agent in an amount of 0.1 to 20% by weight based on the amount of the component (2).

BEST MODE FOR CARRYING OUT THE INVENTION

As described above, the present invention relates to a new characteristic material having a combination of the advantages of organic high molecular substances (e.g., light weight, softness, moldability and the like) and those of inorganic substances (e.g., thermal resistance, high strength and the like). Among other things, in connection with a composition containing a modified block copolymer comprising a vinyl aromatic hydrocarbon and a conjugated diene, or its hydrogenation products, and at least one of fillers selected from the group consisting of silica-based inorganic fillers, metal oxides and metal hydroxides, the present invention provides materials having a high performance and a high functionality which can effectively manifest the functionalities and the characteristics of the both components The modified block copolymer to be used in the present invention consists of a polymer block A comprising primarily a vinyl aromatic hydrocarbon and a polymer block B comprising primarily a conjugated diene, wherein the molecular chain of said modified block copolymer has at the terminals thereof a functional group having at least one of groups selected from the group consisting of a hydroxide group, an epoxy group, an amino group, a silanol group and an alkoxysilane group.

For example, there can be provided a modified block copolymer by reacting a block copolymer consisting of a polymer block A comprising primarily a vinyl aromatic hydrocarbon and a polymer block B comprising primarily a conjugated diene with a modifying agent as described below through an addition reaction to bond the agent to the living terminals of the block copolymer, or the hydrogenation product thereof. The modified block copolymer obtained by this method has a structure expressed, for example, by one of the following general formulae:

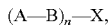 (A—B)$_n$—X,

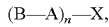 (B—A)$_n$—X,

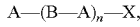 A—(B—A)$_n$—X,

 B—(A—B)$_n$—X,

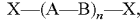 X—(A—B)$_n$—X,

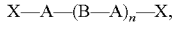 X—A—(B—A)$_n$—X,

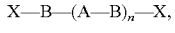 X—B—(A—B)$_n$—X,

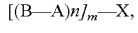 [(B—A)$n$]$_m$—X,

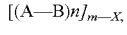 [(A—B)$n$]$_{m—X}$,

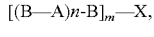 [(B—A)$n$-B]$_m$—X,

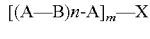 [(A—B)$n$-A]$_m$—X where

A represents a polymer block comprising primarily a vinyl aromatic hydrocarbon, and B represents a polymer block comprising primarily a conjugated diene, n is an integer of 1 or more, generally 1 to 5, and m is an integer of 2 or more, generally 2 to 10.

X is a modifying agent's residue having a functional group as described below.

The polymer block A comprising primarily a vinyl aromatic hydrocarbon in the present invention represents a copolymer block comprising a vinyl aromatic hydrocarbon and a conjugated dienes, which contains 50% by weight or more, preferably 70% by weight or more of a vinyl aromatic hydrocarbon, and/or a homopolymer block of a vinyl aromatic hydrocarbon. The polymer block B comprising primarily a conjugated diene represents a copolymer block comprising a conjugated diene and a vinyl aromatic hydrocarbon, which contains more than 50% by weight, preferably 60% by weight or more of a conjugated diene, and/or a homopolymer block of a conjugated diene. The vinyl aromatic hydrocarbon units may be distributed uniformly or in a tapered form in the copolymer blocks. The copolymer blocks may have a plurality of regions where the vinyl aromatic hydrocarbon units are distributed uniformly and/or a plurality of regions where the units are distributed in the tapered form.

The modified block copolymers to be used in the present invention may be an optional mixture of the modified block copolymers as expressed by the aforementioned general formulae.

As processes for producing the block copolymers before being modified (sometimes referred to simply as "block copolymer" hereinafter), those as disclosed in, e.g., JP43-17979B, JP49-36957B, JP48-4106B, and JP59-166518A may be mentioned.

The vinyl aromatic hydrocarbons to be used in the present invention include, e.g., styrene, o-methylstyrene, p-methylstyrene, p-tert-butylstyrene, 1,3-dimethylstyrene, α-methylstyrene, vinylnaphthalene, vinyl anthracene and the like and a combination of two or more thereof, with styrene being generally used. The conjugated dienes to be used in the present invention include, e.g., 1,3-butadiene, 2-methyl-1,3-butadiene (isoprene), 2,3-dimethyl-1,3-butadiene, 1,3-pentadiene, 1,3-hexadiene and the like, and a combination of two or more thereof with 1,3-butadiene and isoprene being generally used.

Solvents to be used in the production of the block copolymers of the present invention include, e.g., aliphatic hydrocarbons such as butane, pentane, hexane, isopentane, heptane, octane, and isooctane; alicyclic hydrocarbons such as cyclopentane, methylcyclopentane, cyclohexane, methylcyclohexane, and ethylcyclohexane; and aromatic hydrocarbons such as benzene, toluene, ethylbenzene, and xylene. These solvents may be used alone or in a combination of two or more.

Polymerization initiators to be used in the production of the block copolymers include organic lithium compounds. The organic lithium compounds are those having one or more of lithium atoms in a molecule. For example, mention may be made of ethyl lithium, n-propyl lithium, isopropyl lithium, n-butyl lithium, sec-butyl lithium, tert-butyl lithium, hexamethylene dilithium, butadienyl dilithium, isoprenyl dilithium, and the like. These initiators may be used alone or in a combination of two or more. The organic lithium compounds may be added in portions in the course of the production (polymerization) of the block copolymers In the present invention, polar compounds and randomizing agents may be used for the purposes of controlling the polymerization rate in the production of the block copolymers, the micro-structures of the polymerized conjugated diene moieties, and the occurrence of a random copolymerization of conjugated dienes and vinyl aromatic hydrocarbons. The polar compounds and the randomizing agents include ethers, amines, thioethers, phosphines, phosphoramides, potassium or sodium salts of alkylbenzene sulfonates, alkoxydes of potassium or sodium and the like. Practically examples of the ethers include dimethyl-ether, diethylether, diphenylether, tetrahydrofuran, diethyleneglycol dimethylether, and diethyleneglycol dibutylether. The amines include tertiary amines, trimethylamine, triethylamine, tetramethylethylene diamine, and other cyclic tertiary amines. The phosphines and phosphoramines include triphenylphosphine, hexamethylphosphoramide, and the like.

The polymerization temperature in the production of the block copolymers according to the present invention is preferably −10 to 150° C., more preferably 30 to 120° C. Although it depends upon reaction conditions, the polymerization period is preferably within 48 hours, particularly preferably 0.5 to 10 hours. The polymerization system should be preferably in the atmosphere of inert gas, such as nitrogen gas. The polymerization pressure is not critical, provided that it is a pressure in the range enough to keep the monomers and the solvents in a liquid phase within the aforementioned polymerization temperature range. Moreover, it should preferably be in mind that impurities making the catalysts and the living polymers inactive, such as water, oxygen, carbon dioxide gas and the like should be prevented from introducing into the polymerization system.

The component (1), i.e., the modified block copolymer and its hydrogenation products to be used in the present invention is a modified block copolymer which has a functional group having at least one of groups selected from the group consisting of a hydroxide group, an epoxy group, an amino group, a silanol group and an alkoxysilane group bonded to the terminals of its molecular chain, or its hydrogenation products. As a process for producing those modified block copolymers having such functional groups, as described above, a process of reacting the block copolymer at its living terminal(s) with a modifying agent having the aforementioned functional group(s) or with a modifying agent having the aforementioned functional groups protected by a known technique may be mentioned. Although there may be a case where the hydroxide group and the amino group are in the form of organic metal salt after the modifying agents were reacted depending upon the kinds thereof, in such a case, they can be converted to a hydroxide group and an amino group by treating with a compound containing an active hydrogen such as water and alcohols.

In the present invention, after the block copolymers were subjected at their living terminals to the reaction with modifying agents, there might be remained a part of unmodified block copolymers in a mixture. The unmodified block copolymers may be present in the mixture with the modified block copolymers in a proportion of, preferably not higher than 60% by weight, more preferably not higher than 50% by weight.

Examples of the functional groups having at least one of groups selected from the group consisting of a hydroxide group, an epoxy group, an amino group, a silanol group, and an alkoxysilane group include those selected from the group consisting of functional groups represented by the following general formulae (1) to (14):

$$—NR^9—R^{10}—OH \quad (1)$$

$$—N[R^{10}—OH]_2 \quad (2)$$

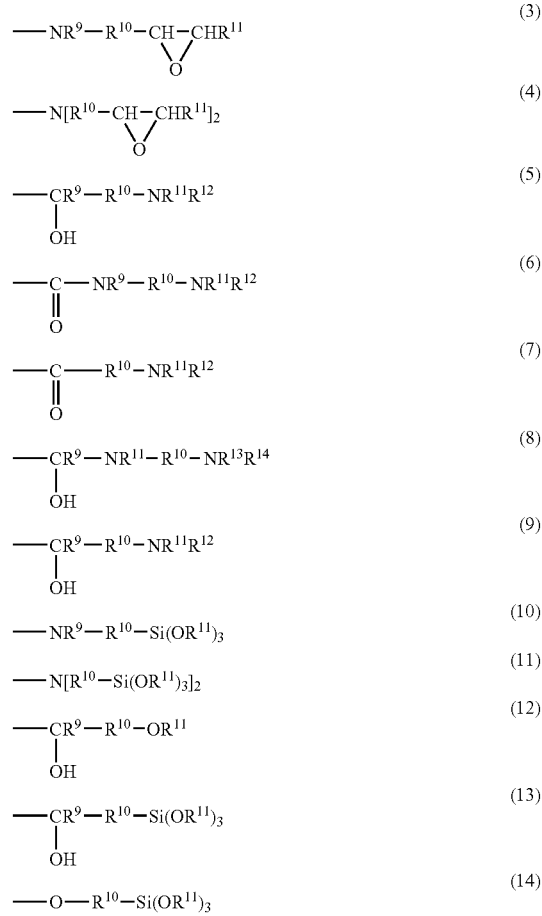

where $R^9$, $R^{12}$ to $R^{14}$ are a hydrogen, a hydrocarbon group having carbon atoms of 1 to 24, or a hydrocarbon group having a functional group selected from the group consisting of a hydroxide group, an epoxy group, a silanol group, and an alkoxysilane group and having carbon atoms of 1 to 24;

$R^{10}$ is a hydrocarbon chain having carbon atoms of 1 to 30, or a hydrocarbon chain having a functional group selected from the group consisting of a hydroxide group, an epoxy group, a silanol group, and an alkoxysilane group and having carbon atoms of 1 to 30;

hydrocarbon groups $R^9$, $R^{12}$ to $R^{14}$ and hydrocarbon chain $R^{10}$ may have an element such as oxygen, nitrogen or silicon bonded in the bonding form other than the hydroxide group, the epoxy group, the silanol group, and the alkoxysilane group; and $R^{11}$ is a hydrogen or an alkyl group having carbon atoms of 1 to 8.

The modifying agents to be used for producing the modified block copolymers of the present invention include, e.g., tetraglycidyl m-xylenediamine, tetraglycidyl-1,3-bisaminomethylcyclohexane, tetraglycidyl-p-phenylenediamine, tetraglycidyldiamino-diphenylmethane, diglycidylaniline, diglycidylorthotoluidine, γ-glycidoxyethyltrimethoxysilane, γ-glycidoxypropyl trimethoxysilane, γ-glycidoxybutyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, γ-glycidoxypropyl methyldimethoxysilane, γ-glycidoxypropyl ethyldimethoxysilane, γ-glycidoxypropyl ethyldiethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl dimethylmethoxysilane, γ-glycidoxypropyl diethylethoxysilane, γ-glycidoxypropyl dimethylethoxysilane, γ-glycidoxypropyl dimethylphenoxysilane, γ-glycidoxypropyl diethylmethoxysilane, γ-glycidoxypropyl methyldiisopropeneoxysilane, bis(γ-glycidoxypropyl) dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyl trimethoxysilane, γ-methacryloxypropyl triethoxysilane, γ-methacryloxymethyl trimethoxysilane, γ-methacryloxyethyl triethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropeneoxy-silane, 1,3-dimethyl-2-imidazolidinone, 1,3-diethyl-2-imidazolidinone, N,N'-dimethylpropyleneurea, and N-methylpyrrolidone.

The reaction with the aforementioned modifying agents can produce the modified block copolymers comprising the polymer block A and/or the polymer block B to which the residue of the modifying agents, i.e., a functional group selected from the group consisting of a hydroxide group, an epoxy group, an amino group, a silanol group, and an alkoxysilane group is bonded, or the hydrogenation products of the modified block copolymers. The sites of the modified block copolymers, to which the residue of the modifying agents is bonded, are not critical, though it is preferred that it is bonded to the polymer block A to achieve a composition having excellent physical properties at high temperatures.

The amount of the modifying agents containing functional groups to be used for the addition reaction with the living terminals of the block copolymers in the present invention should be preferably higher than 0.5 equivalent, more preferably higher than 0.7 equivalent, and most preferably higher than 0.9 equivalent based on one equivalent of the living terminals of the block copolymers, while it should be preferably not higher than 10 equivalents, more preferably not higher than 5 equivalents, and most preferably not higher than 4 equivalents based on one equivalent of the living terminals of the block copolymers.

The amount of the living terminals of the block copolymers in the present invention can be calculated from the amount of organic lithium compounds used in the polymerization and the number of lithium atoms bonded to the organic lithium compounds.

The hydrogenation products of the modified block copolymers of the present invention can be obtained by hydrogenating the modified block copolymers produced by the aforementioned process. Hydrogenation catalysts to be used for the hydrogenation are not critical and may be as conventionally known catalysts (i) heterogeneous supported catalysts such as Ni, Pt, Pd, and Ru metals on the supports of carbon, silica, alumina diatomaceous earth or the like, (ii) so-called Ziegler hydrogenation catalysts employing transition metal salts such as organic acid salts or acetylacetonates of Ni, Co, Fe, or Cr and a reducing agent such as organic aluminum, (iii) homogeneous hydrogenation catalysts such as so-called organic metal complexes, e.g., organic metal compounds of Ti, Ru, Rh, Zr, or the like.

In practice those hydrogenation catalysts as disclosed in JP42-8704B, JP43-6636B, JP63-4841B, JP1-37970B, JP1-53851B, and JP2-9041B may be useful. Preferred hydrogenation catalysts include a mixture of titanocene compounds and reducing organic metal compounds.

The titanocene compounds as those disclosed in JP8-109219A may be used, though practically a compound containing at least one of ligands having a substituted or unsubstituted cyclopentadienyl skeleton, an indenyl skeleton, or a fluorenyl skeleton such as biscyclopentadienyl titanium dichloride, or monopentamethylcyclopentadienyl titanium trichloride may be mentioned. The reducing organic metal compounds include organic alkali metal compounds such as organic lithium, organic magnesium compounds, organic aluminum compounds, organic boron compounds, or organic zinc compounds.

The hydrogenation reaction is performed generally in the temperature range of 0 to 200° C., preferably 30 to 150° C. The hydrogen pressure to be used in the hydrogenation reaction ranges from 0.1 to 15 MPa, preferably from 0.2 to 10 MPa, more preferably from 0.3 to 5 MPa. The hydrogenation reaction time ranges from 3 minutes to 10 hours, preferably 10 minutes to 5 hours. The hydrogenation reaction may be conducted in a batch process, a continuous process, or in a combination thereof.

The structural units originated from the conjugated dienes in the hydrogenation products of the modified block copolymers can be represented by the following general formulae (a) to (e):

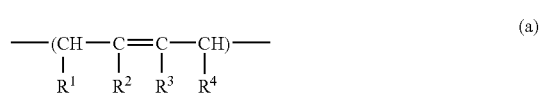

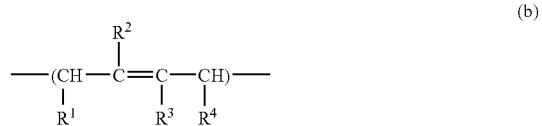

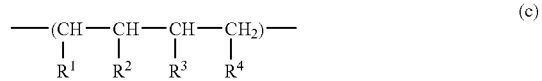

-continued

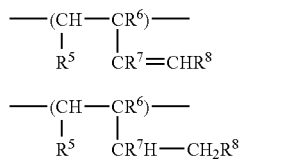

(e)
$$—(CH—CR^6)—$$
$$\quad | \qquad |$$
$$\quad R^5 \quad CR^7H—CH_2R^8$$

where $R^1$ to $R^8$ represents independently a hydrogen, a halogen, an aliphatic hydrocarbon having carbon atoms of 1 to 20, or an aromatic hydrocarbon having carbon atoms of 1 to 20, and they may be identical to or different from one another; the formula (a) represents a cis-structure, and the formula (b) represents a trans-structure.

The hydrogenation rate of the hydrogenated modified block copolymers should be preferably not less than 10%, more preferably 30 to 100%, most preferably 50 to 100% from the point of view of achieving a composition having good thermal stability. The hydrogenation rate of the hydrogenated modified block copolymers may be expressed by the following equation on the basis of the above formulae (a) to (e).

Hydrogenation rate=$(c+e)/(a+b+c+d+e) \times 100$

Moreover, the proportion of the structural units having a vinyl bond to the whole structural units originated from the conjugated dienes in the hydrogenated modified block copolymers should be preferably in the range from 10 to 85%, more preferably 30 to 75%, most preferably 35 to 70% from the point of view of the productivity of the block copolymers and the softness and the impact resistance of the resulting compositions. The proportion of the structural units having a vinyl bond to the whole structural units originated from the conjugated dienes can be expressed by the following equation on the basis of the above formulae (a) to (e).

Proportion of vinyl bonds=$(d+e)/(a+b+c+d+e) \times 100$

Furthermore, the proportion of the 1,2C=C units to the whole structural units originated from the conjugated dienes in the hydrogenated modified block copolymers should be preferably in the range not higher than 15%, more preferably 0 to 7%, most preferably 0 to 3% from the point of view of achieving a composition having a good thermal stability. The proportion of the 1,2C=C units based on the total structural units originated from the conjugated dienes can be expressed by the following equation on the basis of the above formulae (a) to (e):

Proportion of 1,2C=C units=$d/(a+b+c+d+e) \times 100$

The content of the vinyl aromatic hydrocarbons in the modified block copolymers or the hydrogenation products thereof as described above can be determined by using a ultraviolet spectrophotometer and the like. The proportion of the structural units having a vinyl bond to the whole structural units originated from the conjugated dienes in the hydrogenated modified block copolymers and the hydrogenation rate of the hydrogenated modified block copolymers can be determined by using a nuclear magnetic resonance (NMR) system. Alternatively, the content of the vinyl aromatic hydrocarbons in the hydrogenated modified block copolymers may be grasped as the content of the vinyl aromatic hydrocarbons in the copolymers before the hydrogenation.

The final modified block copolymers or the hydrogenation products thereof can be obtained by removing the catalyst residue from a solution of the modified block copolymers or the hydrogenation products thereof produced by the aforementioned processes, as required, and separating the solvents. As processes for separating the solvents, there may be mentioned, e.g., a process comprising adding a polar solvent such as acetone or alcohol, which is a poor solvent for the polymer, to the polymer solution resulting in precipitation of the polymer and then recovering the polymer; a process comprising pouring the polymer solution into a hot water with stirring and stripping with steam to remove the solvent and recovering the polymer; or a process comprising heating directly the polymer solution to evaporate and remove the solvent.

Stabilizers which may be added to the modified block copolymers used in the present invention or the hydrogenation products thereof include various phenolic stabilizers, phosphorus-based stabilizers, sulfur-based stabilizers, and amine-based stabilizers.

The content of the vinyl aromatic hydrocarbons in the component (1) used in the present invention should be from 5 to 95% by weight, preferably 8 to 80% by weight, more preferably 10 to 70% by weight. If it is lower than 5% by weight, the resulting composition is undesirably poor in permanent compression set and tensile strength, while if it is higher than 95% by weight, the resulting composition is undesirably reduced in impact resistance. In case the content of the vinyl aromatic hydrocarbons is generally not higher than 60% by weight, specifically not higher than 55% by weight, the component (1) exhibits characteristics as a thermoplastic elastic body, while in case it is generally higher than 60% by weight, specifically 65% by weight or higher, the component (1) exhibits characteristics as a thermoplastic resin.

The component (1) should preferably have a weight average molecular weight of 30,000 or more from the standpoint of tensile strength of the composition, 1,000,000 or less from the standpoint of processability, more preferably 60,000 to 800,000, still more preferably 70,000 to 600,000. The weight average molecular weight may be determined from the peak molecular weight shown in a chromatogram obtained by using a gel permeation chromatography (GPC) on the basis of a calibration curve which is obtained from measurements with commercially available standard polystyrenes (which is drawn by using the peak molecular weight of a standard polystyrene).

The component (1) should have a block ratio of the vinyl aromatic hydrocarbons of not less than 50%, preferably 50 to 97% by weight, still more preferably 60 to 95% by weight based on the whole vinyl aromatic hydrocarbons in the component (1) to produce a composition being excellent in permanent compression set. The block ratio of vinyl aromatic hydrocarbons refers here to a proportion of the vinyl aromatic hydrocarbon polymer blocks present in the component (1).

The block ratio of the vinyl aromatic hydrocarbons can be determined by using the vinyl aromatic hydrocarbon polymer block components obtained through oxidation decomposition of the block copolymer with tertiary butyl hydroperoxide on an osmium tetrachloride catalyst (which is a process as disclosed in I. M. KOLTHOFF, et al., J. Polym. Sci. 1,429 (1946)), except that the vinyl aromatic hydrocarbon polymer block component having a degree of polymerization of about 30 or less is excluded, according to the following equation.

Block ratio of Vinyl Aromatic Hydrocarbons (%)=
[(Mass of Vinyl aromatic hydrocarbon polymer
blocks in Block copolymer)/(Mass of Whole
Vinyl aromatic hydrocarbons in Block copolymer)]×100

Next, fillers to be used as the component (2) in the present invention will be described. The component (2) is at least one of fillers selected from the group consisting of silica-based inorganic fillers, metal oxides, and metal hydroxides.

The silica-based inorganic fillers refers here to solid particles comprising primarily $SiO_2$ or $Si_3Al$ as structural units. For example, silica, clay, talc, micas, wollastonite, montmorillonite, zeolites, and inorganic fiber materials such as glass fibers can be employed. Moreover, silica-based inorganic fillers having the surfaces made hydrophobic, a combination of two or more of the silica-based inorganic fillers, and a mixture of the silica-based inorganic fillers with non-silica-based inorganic fillers may be used. Silicas which can be used include those such as so-called anhydrous white carbons, hydrous white carbons, synthetic silicate white carbons, and colloidal silica.

The metal oxides refers to solid particles comprising primarily structural units expressed by the chemical formula $M_xO_y$, where M is a metal atom and each of x and y is an integer of 1 to 6, such as alumina, titanium oxide, magnesium oxide, and zinc oxide. A combination of two or more of metal oxides and a mixture of the metal oxides with inorganic fillers other than the metal oxides may be used.

The metal hydroxides which can be used refers to hydrated inorganic fillers such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide, hydrates of inorganic metal compounds such as borax. A combination of two or more of metal hydroxides and a mixture of the metal hydroxides with inorganic fillers other than the metal hydroxides may be used.

The fillers to be used in the present invention should preferably be silica and glass fibers with silica being particularly preferred.

In the present invention, the fillers should have an average particle size in a dispersion of, preferably 0.01 to 2 μm, more preferably 0.03 to 1 g m, most preferably 0.05 to 0.5 μm from the standpoint of dispersing the fillers in a composition and developing sufficiently the effects of the fillers to be added. The average particle size of the fillers in a dispersion can be determined by observing the state of dispersion of the fillers with a transmission electron microscope (TEM) and using an image analyzer.

The amount of the component (2) should be 0.5 to 50 parts by weight, preferably 3 to 40 parts by weight based on 100 parts by weight of the component (1). When the amount of the component (2) to be incorporated is less than 0.5 part by weight, the fillers can not exhibit an effect of addition, while when it is higher than 50 parts by weight, the component (2) is poorly dispersed and the processability and mechanical strength become undesirably reduced.

The composition of the present invention may further contain an olefinic polymer (sometimes referred to as a component (3) hereinunder) in addition to the aforementioned components (1) and (2). As the olefinic polymers, there may be mentioned those as comprising primarily α-olefins such as ethylene, propylene and the like, for example, polyethylenes, polypropylenes, ethylene-propylene copolymers, chlorinated polyethylenes and the like. The olefinic polymers to be used may include those as copolymerized with a small amount of vinyl monomers in addition to the olefins such as ethylene, propylene and the like. For example, ethylene-vinyl acetate copolymers, ethylene-(meth)acrylic acid copolymers, ethylene-(meth)acrylic acid derivative copolymers and the like may be mentioned. Moreover, the olefinic polymers may include also hydrogenation products of polymers comprising conjugated diene monomers such as butadiene, isoprene and the like. These resins may be used in a mixture of two or more of them. The polypropylenes, or the mixture of polypropylenes and ethylene-propylene copolymers are preferred in view of the processability and the mechanical properties of the resulting compositions.

The amount of the component (3) should be preferably 10 to 500 parts by weight, more preferably 20 to 300 parts by weight based on 100 parts by weight of the component (1) in view of the balance between the permanent compression set, the tensile strength and the elasticity of the composition.

In the modified block copolymer composition of the present invention, the component (1), i.e., the modified block copolymers or the hydrogenation products thereof contain specific functional groups so that they have a high affinity to the component (2), fillers, allowing the fillers to finely disperse in the copolymers while exhibiting effectively interaction therebetween due to chemical bonds such as hydrogen-bonds. Thus, it is possible to achieve the objects of the present invention that the modified block copolymer composition being excellent in heat resistance, mechanical strength, transparency, abrasion resistance, and processability can be produced. Moreover, it is also possible to produce a modified block copolymer composition which is excellent in permanent compression set, impact resistance and processability.

The modified block copolymer composition of the present invention may further contain silane coupling agents incorporated. The silane coupling agents are for rendering the interaction between the components (1) and (2) more intimate and contain a group having an affinity or a bonding property to the component (1) and/or the component (2). The silane coupling agents to be used may include those as generally used for inorganic fillers such as silica, for example, 3-mercaptopropyl-trimethoxysilane, 3-mercaptopropylmethyldimethoxysilane, vinyltrimethoxysilane, vinyltriethoxysilane, 2-(3,4-epoxycyclohexyl)ethyltrimethoxysilane, 3-glycidoxypropyl methyldiethoxysilane, 3-glycidoxypropyl triethoxysilane, p-styryltrimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, N-2(aminoethyl)3-aminopropyl methyldimethoxysilane, N-2 (aminoethyl)3-aminopropyl trimethoxysilane, N-2 (aminoethyl)3-aminopropyl triethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, and 3-isocyanatepropyl triethoxysilane.

Particularly preferred silane coupling agents in the present invention are those as having a polysulfide linkage connecting two or more of mercapto groups and/or sulfur atoms together with a silanol group or an alkoxysilane group. Such silane coupling agents include, for example, 3-mercaptopropyltrimethoxysilane, 3-aminopropyltriethoxysilane, bis-[3-(triethoxysilyl)-propyl]-tetrasulfide, bis-[3-(triethoxysilyl)-propyl]-disulfide, bis-[3-(triethoxysilyl)-propyl]-trisulfide, bis-[2-(triethoxysilyl)-ethyl]-tetrasulfide, 3-triethoxysilyl-propyl-N,N-dimethylthiocarbamoyl tetrasulfide, 3-trimethoxysilylpropyl-N,N-dimethyl-thiocarbamoyl tetrasulfide, 3-triethoxysilylpropylbenzothiazole tetrasulfide, and 3-trimethoxysilylpropylbenzothiazole tetrasulfide.

The amount of the silane coupling agents to be incorporated should be preferably 0.1 to 20% by weight, more preferably 0.5 to 18% by weight, still more preferably 1 to 15% by weight based on the amount of the component (2) in order to sufficiently exhibit reinforced effects by the fillers.

The silane coupling agents may be used in combination with sulfur and organic peroxides.

The modified block copolymer composition of the present invention may further be formulated with block copolymers, or the hydrogenation products thereof, which are different from the modified block copolymers or the hydrogenation products thereof to be used in the present invention, such as non-modified block copolymers, thermoplastic resins, rubbery polymers and the like.

The thermoplastic resins include block copolymer resins of vinyl aromatic compounds with conjugated dienes which are different from the modified block copolymers or the hydrogenation products thereof defined in the present invention; vinyl aromatic compound resins such as polystyrenes; copolymer resins of vinyl aromatic compounds with other vinyl monomers, such as ethylene, propylene, butylene, vinyl chloride, vinilidene chloride, vinyl acetate, acrylic acid and acrylate esters such as methyl acrylate, methacrylic acid and methacrylate esters such as methyl methacrylate, acrylonitrile, or methacrylonitrile; rubber-modified styrene resins (HIPS); acrylonitrile-butadiene-styrene-copolymer resins (ABS); methacrylate ester-butadiene-styrene-copolymer resins (MBS); poly(vinyl acetate) resins, i.e., copolymers comprising vinyl acetate with other monomers polymerizable therewith and having a content of vinyl acetate of 50% by weight or more, and the hydrolysis products of the resins; polymers of acrylic acid and its esters and/or amido; polymers of methacrylic acid and its esters and/or amido; polyacrylate resins, i.e., copolymers of 50% by weight or more of the aforementioned acrylic monomers with other copolymerizable monomers; polymers of acrylonitrile and/or methacrylonitrile; nitril resins i.e., copolymers of 50% by weight or more of the aforementioned acrylonitrile monomers with other copolymerizable monomers; aliphatic polyamide resins such as nylon-46, nylon-6, nylon-66, nylon-610, nylon-11, nylon-12, or nylon-6-nylon-12 copolymer; aromatic polyamide resins such as polyphenyleneisophthalamide, polyphenyleneterephthalamide, or poly-metaxylenediamine; polyester resins such as condensation polymers of dibasic acids such as adipic acid, sebacic acid, terephthalic acid, isophthalic acid, P,P'-dicarboxydiphenyl, 2,6-naphthalenedicarboxylic acid, or derivatives therefrom with glycol (or diol) components such as ethylene glycol, propylene glycol, 1,4-butanediol, 1,6-hexanediol, 1,4-cyclohexanediol, P-xylene glycol, or bisphenol A; polyesterdiols such as poly(1,4-butyleneadipate), poly(1,6-hexaneadipate), or polycaprolactone; polyetherdiols such as polyethylene glycols, polypropylene glycols, or polyoxytetramethylene glycols; thermoplastic polyurethane polymers produced by a polyaddition reaction of glycol components selected from glycols such as ethylene glycol, 1,4-butanediol, and 1,6-hexanediol with diisocyanate components such as tolylenediisocyanate, 4,4'-diphenylmethanediisocyanate, or hexamethylenediisocyanate; polycarbonate polymers such as poly-4,4'-dioxydiphenyl-2,2'-propanecarbonate; polysulfone resins such as poly(ethersulfone), poly(4,4'-bisphenolethersulfone), and poly(thioethersulfone); polymers of formaldehyde or trioxane; polyoxymethylene resins such as copolymers of formaldehyde or trioxane with other aldehyde, cyclicether, epoxide, isocyanate, or vinyl compounds; polyphenylene ether resins such as poly(2,6-dimethyl-1,4-phenylene)ether; polyphenylenesulfide resins such as polyphenylenesulfides, or poly4,4'-diphenylenesulfides; polyimides, polyaminobismaleimides (polybismaleimides), bismaleimide-triazine resins; polyimide resins such as polyamidoimido, and polyetherimido.

Those thermoplastic resins should have a number average molecular weight of preferably not less than 1,000, more preferably 5,000 to 5,000,000, still more preferably 10,000 to 1,000,000.

Optionally, a combination of two or more of those thermoplastic resins may be used.

The rubbery polymers include butadiene rubbers and the hydrogenation products thereof, styrene-butadiene rubbers and the hydrogenation products thereof which are different from the modified block copolymers and the hydrogenation products thereof defined in the present invention, isoprene rubbers, acrylonitrile-butadiene rubbers and the hydrogenation products thereof, chloroprene rubbers, ethylene-propylene rubbers, ethylene-propylene-diene rubbers, ethylene-butene-diene rubbers, butyl rubbers, ethylene-butene rubbers, ethylene-hexene rubbers, ethylene-octene rubbers, acrylic rubbers, fluororubbers, silicone rubbers, chlorinated polyethylene rubbers, epichlorohydrin rubbers, α, β-unsaturated nitril-acrylate ester-conjugated diene copolymer rubbers, urethane rubbers, polysulfide rubbers, styrene-butadiene block copolymers and the hydrogenation products thereof, styrene-isoprene block copolymers, and natural rubbers. Those rubbery polymers may be modified rubbers having functional groups attached.

Among the thermoplastic resins and rubbery polymers as described above, most preferably, polystyrene resins and polyphenyleneether resins may be mentioned.

Moreover, optional additives may be incorporated depending upon various end uses as long as they do not adversely affect the effects of the present invention. The type of the additives is not critical, provided that they have been generally used for formulation of thermoplastic resins and rubbery polymers.

For example, rubber softening agents such as naphthenic and/or paraffinic, or polybutenes, low molecular weight polybutadienes, paraffins, organic polysiloxanes, and mineral oils; inorganic fillers such as calcium carbonate, magnesium carbonate, calcium sulfate, and barium sulfate; pigments such as carbon black and iron oxides; lubricants such as stearic acid, behenic acid, zinc stearate, calcium stearate, magnesium stearate, and ethylene bis-stearoamide; releasing agents; plasticizers; antioxidants such as hindered phenolic antioxidants, and phosphorus-containing thermal stabilizers; hindered amine photostabilizers; benzotriazole ultraviolet absorbers; flame retardants; electrostatic inhibitors; reinforcing agents such as organic fibers, glass fibers, carbon fibers, and metal whiskers; colorants; other additives and a combination thereof; and those as described in "Agents for Rubber-Plastic Formulation" (Edited by Rubber Digest-Sha Co., Ltd.) may be mentioned.

Processes for producing the modified block copolymer composition of the present invention are not critical, and any one of known processes may be employed.

For example, the production may be made by using a melt kneader such as a single screw extruder, twin screw extruder, Banbury mixer, heating rolls, Brabender, and various kneaders. In the production, the components may be incorporated in any order, for example, all the components may be kneaded in one time, or optional components may be kneaded and then the remaining components may be added sequentially or in one portion with kneading.

In one embodiment, the production may be conducted by dispersing the component (2) in a solution obtained after the component (1) was polymerized or after the hydrogenation reaction was effected, or in a solution obtained by dissolving the component (1) in a solvent, mixing the whole, and then heating the mixture to remove the solvents.

In the present invention, the melt kneading process with an extruder is preferred in view of productivity, though the mixing in the solvent is specifically recommended in order to produce a highly dispersible composition.

The modified block copolymer composition of the present invention is capable of developing an composite state through a unification of the specific functional groups (as described above) contained in the modified block copolymers or the hydrogenation products thereof with the fillers due to chemical bonding such as hydrogen bonding therebetween. This development of the composite state can be confirmed by the fact that when the components (1) and (2) are mixed in a solution, or when the component (2) is added to a solution of the component (1) and then mixed, few proportion of the component (2) is separated and settled from the mix solution even after standing for a certain period of time with a major proportion being floated in a fine dispersion. Particularly in case the component (2) has a small average particle size (for example, a secondary particle size of less than 50 μm), the existence of the component (2) settled on the bottom of a vessel is substantially nearly undiscernable. On the other hand, in case the component (1) does not have any functional groups as defined in the present invention, almost all the component (2) is settled down on the bottom of a vessel from a solution of a mixture of the component (1) with the component (2) after leaving to stand for a certain period of time.

The block copolymer composition of the present invention can be shaped with conventional thermoplastic resin molding machines. It can be used as various molded articles such as sheet, film, various forms of injection-molded articles, blow-molded articles, pressure-formed shapes, vacuum-molded articles, extrusion-molded articles and the like. Those molded articles can be used for food packaging materials, medical instrument materials, domestic appliances and parts thereof, materials for automobile parts, industrial products, daily goods, toys and the like, and materials for footwear and the like.

EXAMPLES 1–17 AND COMPARATIVE EXAMPLES 1–15

The present invention will be described practically with reference to examples below, but it is not intended that the present invention is limited to those examples.

In the following examples, the modified block copolymers or the hydrogenation products thereof and the modified block copolymer compositions were measured for physical properties according to the procedures as described under. In the examples, the modified block copolymer and the modified block copolymer composition are abbreviated simply "block copolymer" and "block copolymer composition", respectively.

1. Characteristics of Block Copolymers and the Hydrogenation Products Thereof (1) Styrene Content Styrene content was calculated from the absorbance intensity at 262 nm obtained with a UV spectrophotometer (HITACHI UV 200).

(2) Rate of Hydrogenation of Polybutadiene Moieties, Proportion of Vinyl Bonds, and Proportion of the 1,2C=C Units These were measured with a nuclear magnetic resonance apparatus (DPX-400 available from BRUCKER Corporation).

(3) Weight Average Molecular Weight

GPC (Apparatus: LC1O made by SHIMADZU CORPORATION Column: Shimpac GPC805+GPC804+GPC804+GPC803 made by SHIMADZU CORPORATION) was used to make the measurement. Tetrahydrofuran was used as solvent, and the measurement temperature was 35° C. From the peak molecular weight on a chromatogram, the weight average molecular weight was determined according to a calibration curve which has been obtained from the measurement of commercially available standard polystyrenes (which was made by using the peak molecular weights of standard polystyrenes).

(4) Proportion of Unmodified Block Copolymers

GPC Column filled with a silica-based gel has a characteristic to adsorb the modified components, and this characteristic was made use of to perform the measurement. For a sample solution containing the modified block copolymers and the internal standard polystyrenes having a low molecular weight, the proportion of the modified block copolymers to the standard polystyrenes on the chromatogram obtained in the above (3) was compared with the proportion of the modified block copolymers to the standard polystyrenes on the chromatogram which was obtained by GPC with a silica column (Zorbax: a column made by DuPont Company) to determine an amount of the components absorbed on the silica column from the difference between both the proportions. A proportion of the unmodified block copolymers is that of the copolymers which were not adsorbed on the silica column.

(5) Content of Styrene Homopolymer Block (Block Ratio)

Styrene homopolymer blocks obtained by an oxidation decomposition of copolymers according to the process as described above were analyzed with a ultraviolet radiation spectrophotometer and the block rate was determined by using the formula as follows.

Block ratio (%)=[(Weight percent of styrene homopolymer blocks in the block copolymers before hydrogenation)/(Weight percent of the whole styrene in the block copolymers before hydrogenation)]×100

2. Measurement of Physical Properties of the Block Copolymer Composition (1) Transparency (Haze)

The block copolymer composition was molded under compression into a sheet of a thickness of 2 mm as a test specimen which was measured according to ASTM-D1003.

(2) Heat Resistance

The block copolymer composition was measured for the variation of dynamic storage modulus (E') with temperature by using a DMA spectrometer (983DMA available from DuPont Company) under the conditions as described below to evaluate the heat resistance at an inflection temperature in the high temperature region.

Thickness of the test specimen: 2 mm.
Length of a span: 16 mm.
Measurement temperature: 0° C. to 200° C.
Rate of temperature increase: 2° C./min.
Measurement frequency mode: resonance frequency.

(3) Abrasion Resistance

The test specimen was measured for weight variation before and after abraded 1000 times with a color fastness rubbing tester (AB-301 available from TESTER SANGYO CO., LTD.)

(4) Processability

The block copolymer composition was melt-kneaded with twin-screw open rollers at 200° C., and evaluated for processability from the conditions of winding around the rollers in three ratings as follows:

○: Good conditions of winding around the rollers

Δ: incapable of winding around the rollers, but capable of forming into sheet.

×: incapable of forming into sheet, and substantially difficult to knead.

(5) JIS-A Hardness

The measurement was made according to JIS-K6301.

(6) Permanent Compression Set (%)

The measurement was made according to JIS-K-6301 (70° C.×22 hours).

(7) Tensile Strength (MPa) and Tensile Elongation (%)

The measurement was made according to JIS-K-6251. The elongation velocity was 500 mm/min.

(8) Flexural Strength (MPa)

The measurement was made according to ASTM-D790.

(9) Notched Izod Impact Strength (J/m)

The measurement was made according to JIS-K-7110.

(10) Average Particle Size in a Dispersion of Fillers (μm)

The average particle size in a dispersion of fillers was measured with a transmission electron microscope (TEM). TEM measurement allowed the dispersion conditions of fillers to observe at a magnification of 5000 to 100,000 and the number average particle size in a dispersion was determined with an image analysis system (Win ROOF, an image analysis system made by MITANI CORPORATION). The number average particle size in a dispersion ($d_n$) is defined here as follows:

$d_n = \Sigma n_i d_i / \Sigma n_i$ ($n_i$ is the number of particles having a particle size of $d_i$)

The term "particle size" as used here refers to the diameter of an equivalent circle having the same area as that of the particle.

3. Preparation of Hydrogenation Catalysts

In the preparation of the block copolymers as described below, the hydrogenation catalysts which were used in the hydrogenation reaction were prepared according to the following method:

(1) Hydrogenation Catalyst I

One liter of a dry purified cyclohexane was charged into a reaction vessel which had been purged with nitrogen, to which 100 mmol of bis($\eta^5$-cyclopentadienyl)titanium dichloride were added and with sufficiently stirring a n-hexane solution containing 200 mmol of trimethyl aluminum was added. The reaction was conducted for about three days at room temperature.

(2) Hydrogenation Catalyst II

Two liters of a dry purified cyclohexane were charged into a reaction vessel which had been purged with nitrogen, to which 40 mmol of bis($\eta^5$-cyclopentadienyl)titanium di-(p-tolyl) and 150 g of 1,2-polybutadiene having a molecular weight of about 1000 (a proportion of vinyl bonds: about 85%) were added and thereafter a cyclohexane solution containing 60 mmol of n-butyl lithium was added. Immediately after the reaction was conducted for 5 minutes at room temperature, 40 mmol of n-butanol were added with stirring and the content was preserved at room temperature.

4. Incorporated Components

In the examples under, the following compounds were employed as components:

(1) Block Copolymers

The block copolymers were prepared by the procedure as described hereinunder. The characteristics of the resulting block copolymers are given in Tables 1 and 2.

(2) Fillers

Silica A: Precipitated silica (Sipernat 500LS: Secondary particle size of 3.5 μm; available from Degussa Huls AG)

Silica B: Highly dispersible anhydrous silica (HDK N20, available from Wacker Asahikasei Silicone Co., Ltd.)

Silica C: Wet silica (Ultrasil VN3: Secondary particle size of 16 μm; available from Degussa)

(3) Olefinic Polymers

Polypropylenes (PM801A, available from Montel SDK Co., Ltd.)

(4) Silane Coupling Agents

Bis-(3-triethoxysilylpropyl)-tetrasulfide (available from Degussa, referred to as "Si69" hereinafter)

(5) Other Components

Rubber softening agents: Diana Process Oil PW-380, made by Idemitsu Kosan Co., Ltd.

Polystyrene resin: Polystyrene 685, made by A & M STYRENE CO., LTD.

Polyphenylene ether resin: Poly(2,6-dimethyl-1,4-phenylene ether) (Reduction viscosity, 0.54).

5. Preparation of Block Copolymers

1) Polymer 1

Into an autoclave equipped with a stirrer and a jacket after it was cleaned, dried and purged with nitrogen, a solution containing 10 parts by weight of a previously purified styrene in cyclohexane (a concentration of 20% by weight) was charged. Then n-butyl lithium and tetramethylethylene diamine were added and after polymerizing at 70° C. for one hour, a solution containing 80 parts by weight of a previously refined butadiene in cyclohexane (a concentration of 20% by weight) was added and then the polymerization was conducted at 70° C. for one hour. Moreover, a solution containing 10 parts by weight of styrene in cyclohexane was added and then the polymerization was effected at 70° C. for one hour. Thereafter, tetraglycidyl-1,3-bisaminomethyl cyclohexane as a modifier (referred to as Modifier M1 hereunder) was reacted in an equivalent molar amount to that of the n-butyl lithium used in the polymerization. The resulting modified block copolymer had a styrene content of 20% by weight with a proportion of the viny bonds in the polybutadiene moiety being of 50%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. The resulting hydrogenated modified block copolymer (Polymer 1) had the properties as shown in Table 1. In this case, the proportion of the unmodified block copolymer included in the Polymer 1 was 20% by weight.

2) Polymer 2

Polyer 2 was prepared in the same procedure as that for Polyer 1, except that the modifier was omitted. The properties of Polyer 2 are reported in Table 1.

3) Polymer 3

Into an autoclave equipped with a stirrer and a jacket after it was cleaned, dried and purged with nitrogen, a solution containing 10 parts by weight of a previously purified styrene in cyclohexane (a concentration of 20% by weight) was charged. Then n-butyl lithium and tetramethylethylene diamine were added and after polymerizing at 70° C. for one hour, a solution containing 60 parts by weight of a previously refined butadiene in cyclohexane (a concentration of 20% by weight) was added and then the polymerization was conducted at 70° C. for one hour. Moreover, a solution containing 10 parts by weight of styrene in cyclohexane was added and then the polymerization was effected at 70° C. for one hour. Thereafter, further a solution containing 20 parts by weight of butadiene in cyclohexane was added and then the polymerization was conducted at 70° C. for one hour. Then tetraglycidylmetaxylene diamine as a modifier (referred to hereunder as Modifier M2) was reacted in an equivalent molar amount to that of the n-butyl lithium used for the polymerization. The resulting modified block copolymer had a styrene content of 20% by weight with a proportion of the vinyl bonds in the polybutadiene moiety being 50%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. The resulting hydrogenated modified block copolymer (Polymer 3) had the properties as shown in Table 1. In this case, the proportion of the unmodified block copolymer included in the Polymer 3 was 20% by weight.

4) Polymer 4

Polyer 4 was prepared in the same procedure as that for Polyer 3, except that the modifier was omitted. The properties of Polyer 4 are reported in Table 1.

5) Polymer 5

Into an autoclave equipped with a stirrer and a jacket after it was cleaned, dried and purged with nitrogen, a solution containing 20 parts by weight of a previously purified styrene in cyclohexane (a concentration of 20% by weight) was charged. Then n-butyl lithium and tetramethylethylene diamine were added and after polymerizing at 70° C. for one hour, a solution containing 60 parts by weight of a previously refined butadiene in cyclohexane (a concentration of 20% by weight) was added and then the polymerization was conducted at 70° C. for one hour. Moreover, a solution containing 20 parts by weight of styrene in cyclohexane was added and then the polymerization was effected at 70° C. for one hour. Thereafter, the Modifier M1 was reacted in a ¼ equivalent molar amount to that of the n-butyl lithium used for the polymerization. The resulting modified block copolymer had a styrene content of 40% by weight with a proportion of the vinyl bonds in the polybutadiene moiety being 17%.

To the modified block copolymer as obtained above, methanol was added to deactivate it, then 2-t-butyl-6-(3-t-butyl-2-hydroxy-5-methylbenzyl)-4-methylphenylacrylate was added as stabilizer in an amount of 0.3 part by weight based on 100 parts by weight of the modified block copolymer. The solution of modified block copolymer in cyclohexane was subjected to steam stripping to remove the cyclohexane therefrom so as to produce a modified block copolymer (Polymer 5) which had the properties as shown in Table 1. In this case, the proportion of the unmodified block copolymer included in the Polymer 5 was 30% by weight.

6) Polymer 6

Polyer 6 was prepared in the same procedure as that for Polyer 5, except that SiCl4 was employed in a ¼ equivalent molar amount to that of n-butyl lithium used in the polymerization instead of the Modifier Ml. The properties of Polyer 6 are reported in Table 1.

7) Polymer 7

Into an autoclave equipped with a stirrer and a jacket after it was cleaned, dried and purged with nitrogen, a solution containing 35 parts by weight of a previously purified styrene in cyclohexane (a concentration of 20% by weight) was charged. Then n-butyl lithium and tetramethylethylene diamine were added and after polymerizing at 70° C. for one hour, a solution containing 20 parts by weight of a previously refined butadiene and 10 parts by weight of styrene in cyclohexane (a concentration of 20% by weight) was added and then the polymerization was conducted at 70° C. for one hour. Moreover, a solution containing 35 parts by weight of styrene in cyclohexane was added and then the polymerization was effected at 70° C. for one hour. Thereafter, N-(1, 3-dimethylbutylidene)-3-(triethoxysilyl)-1-propaneamine as modifier (referred to hereinunder Modifier M3) was reacted in an equivalent molar amount to that of the n-butyl lithium used for the polymerization. The resulting modified block copolymer had a styrene content of 80% by weight with a proportion of the vinyl bonds in the polybutadiene moiety being 35%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. The resulting hydrogenated modified block copolymer (Polymer 7) had the properties as shown in Table 1. In this case, the proportion of the unmodified block copolymer included in the Polymer 7 was 40% by weight.

8) Polymer 8

Into an autoclave equipped with a stirrer and a jacket after it was cleaned, dried and purged with nitrogen, a solution containing 15 parts by weight of a previously purified styrene in cyclohexane (a concentration of 20% by weight) was charged. Then n-butyl lithium and tetramethylethylene diamine were added and after polymerizing at 70° C. for one hour, a solution containing 70 parts by weight of a previously refined butadiene in cyclohexane (a concentration of 20% by weight) was added and then the polymerization was conducted at 70° C. for one hour. Moreover, a solution containing 15 parts by weight of styrene in cyclohexane was added and then the polymerization was effected at 70° C. for one hour. Thereafter, γ-glycidoxypropyl triemethoxysilane as modifier (referred to hereinunder as "Modifier M4") was reacted in an equivalent molar amount to that of the n-butyl lithium used for the polymerization. The resulting modified block copolymer had a styrene content of 30% by weight with a proportion of the vinyl bonds in the polybutadiene moiety being 40%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. The solution of hydrogenated modified block copolymer in cyclohexane was subjected to steam stripping to remove the cyclohexane so as to produce a hydrogenated modified block copolymer (Polymer 8) which had the properties as shown in Table 1. In this case, the proportion of the unmodified block copolymer included in the Polymer 8 was 25% by weight.

9) Polymer 9

Into an autoclave equipped with a stirrer and a jacket after it was cleaned, dried and purged with nitrogen, a solution containing 8 parts by weight of a previously purified styrene in cyclohexane (a concentration of 20% by weight) was charged. Then n-butyl lithium and tetramethylethylene diamine were added and after polymerizing at 70° C. for one hour, a solution containing 85 parts by weight of a previously refined isoprene in cyclohexane (a concentration of 20% by weight) was added and then the polymerization was conducted at 70° C. for one hour. Moreover, a solution containing 7 parts by weight of styrene in cyclohexane was added and then the polymerization was effected at 70° C. for one hour. Thereafter, the Modifier Ml was reacted in a ¼ equivalent molar amount to that of the n-butyl lithium used for the polymerization. The resulting modified block copolymer had a styrene content of 15% by weight with a proportion of the vinyl bonds in the polyisoprene moiety being 30%.

To the modified block copolymer as obtained above, methanol was added to deactivate it, then 2-t-butyl-6-(3-t-butyl-2-hydroxy-5-methylbenzyl)-4-methylphenylacrylate was added as stabilizer in an amount of 0.3 part by weight based on 100 parts by weight of the modified block copolymer. The solution of the modified block copolymer in cyclohexane was subjected to steam stripping to remove the cyclohexane so as to produce a modified block copolymer (Polymer 9) which had the properties as shown in Table 1. In this case, the proportion of the unmodified block copolymer included in the Polymer 9 was 30% by weight.

10) Polymer 10

Polyer 10 was prepared in the same procedure as that for Polyer 1, except that 1,3-dimethyl-2-imidazolidinone (referred to M5 hereinafter) was employed as a modifier. The properties of Polyer 10 are reported in Table 1.

TABLE 1

| Sample No. | Styrene Content (wt. %) | Proportion of Viny bonds (%) | Weight Average Molecular Weight (×10,000) | Types of Modifier | Hydrogenation Rate (%) |
|---|---|---|---|---|---|
| Polymer 1 | 20 | 50 | 8 | M1 | 98 |
| Polymer 2 | 20 | 50 | 8 | None | 98 |
| Polymer 3 | 20 | 50 | 8 | M2 | 98 |
| Polymer 4 | 20 | 50 | 8 | None | 98 |
| Polymer 5 | 40 | 17 | 15 | M1 | 0 |
| Polymer 6 | 40 | 17 | 15 | SiCl$_4$ | 0 |
| Polymer 7 | 80 | 35 | 20 | M3 | 98 |
| Polymer 8 | 30 | 40 | 10 | M4 | 98 |
| Polymer 9 | 15 | 30 | 18 | M1 | 0 |
| Polymer 10 | 20 | 50 | 8 | M5 | 98 |

11) Polymer 11

Into an autoclave equipped with a stirrer and a jacket after it was cleaned, dried and purged with nitrogen, a solution containing 14.7 parts by weight of a previously purified styrene in cyclohexane (a concentration of 20% by weight) was charged. Then n-butyl lithium and tetramethylethylene diamine were added and after polymerizing at 70° C. for one hour, a solution containing 72 parts by weight of a previously refined butadiene in cyclohexane (a concentration of 20% by weight) was added and then the polymerization was conducted at 70° C. for one hour. Moreover, a solution containing 13.3 parts by weight of styrene in cyclohexane was added and then the polymerization was effected at 70° C. for one hour. Thereafter, the Modifier M5 was reacted in an equivalent molar amount to that of the n-butyl lithium used for the polymerization. The resulting modified block copolymer had a styrene content of 28% by weight with a proportion of the vinyl bonds in the polybutadiene moiety being 38%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the block copolymer. Then the resulting solution of hydrogenated modified block copolymer in cyclohexane was heated to remove the cyclohexane so as to produce a hydrogenated modified block copolymer (Polymer 11). The analysis of the polymer 11 showed the results as shown in Table 2. In this case, the proportion of the unmodified block copolymer included in the Polymer 11 was 20% by weight.

12) Polymer 12

Polyer 12 was prepared in the same procedure as that for Polyer 11, except that the modifier was not employed. The properties of Polyer 12 are reported in Table 2.

13) Polymer 13

Polyer 13 was prepared in the same procedure as that for Polyer 11, except that SiCl4 was employed in a ¼ equivalent molar amount to that of the n-butyl lithium used in the polymerization instead of the Modifier M5. The properties of Polyer 13 are reported in Table 2.

14) Polymer 14

Into an autoclave equipped with a stirrer and a jacket after it was cleaned, dried and purged with nitrogen, a solution containing 20.5 parts by weight of a previously purified styrene in cyclohexane (a concentration of 20% by weight) was charged. Then n-butyl lithium and tetramethylethylene diamine were added and after polymerizing at 70° C. for one hour, a solution containing 61 parts by weight of a previously refined butadiene in cyclohexane (a concentration of 20% by weight) was added and then the polymerization was conducted at 70° C. for one hour. Moreover, a solution containing 18.5 parts by weight of styrene in cyclohexane was added and then the polymerization was effected at 70° C. for one hour. Thereafter, the Modifier Ml was reacted in an equivalent molar amount to that of the n-butyl lithium used for the polymerization. The resulting modified block copolymer had a styrene content of 39% by weight with a proportion of the vinyl bonds in the polybutadiene moiety being 37%.

To the block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the block copolymer. Then the resulting solution of hydrogenated modified block copolymer in cyclohexane was heated to remove the cyclohexane so as to produce a hydrogenated modified block copolymer (Polymer 14). The analysis of the polymer 14 showed the results as shown in Table 2. In this case, the proportion of the unmodified block copolymer included in the Polymer 14 was 25% by weight.

15) Polymer 15

Into an autoclave equipped with a stirrer and a jacket after it was cleaned, dried and purged with nitrogen, a solution containing 17.8 parts by weight of a previously purified styrene in cyclohexane (a concentration of 20% by weight) was charged. Then n-butyl lithium and tetramethylethylene diamine were added and after polymerizing at 70° C. for one hour, a solution containing 66 parts by weight of a previously refined butadiene in cyclohexane (a concentration of 20% by weight) was added and then the polymerization was conducted at 70° C. for one hour. Moreover, a solution containing 16.2 parts by weight of styrene in cyclohexane was added and then the polymerization was effected at 70° C. for one hour. Thereafter, the Modifier M4 was reacted in an equivalent molar amount to that of the n-butyl lithium used for the polymerization. The resulting modified block copolymer had a styrene content of 34% by weight with a proportion of the vinyl bonds in the polybutadiene moiety being 42%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. Then the resulting solution of hydrogenated modified block copolymer in cyclohexane was heated to remove the cyclohexane so as to produce a hydrogenated modified block copolymer (Polymer 15). The analysis of the Polymer 15 showed the results as shown in Table 2. The proportion of the unmodified block copolymer included in the Polymer 15 was 25% by weight.

16) Polymer 16

Into an autoclave equipped with a stirrer and a jacket after it was cleaned, dried and purged with nitrogen, a solution containing 35.1 parts by weight of a previously purified styrene in cyclohexane (a concentration of 20% by weight) was charged. Then n-butyl lithium and tetramethylethylene diamine were added and after polymerizing at 70° C. for one hour, a solution containing 33 parts by weight of a previously refined butadiene in cyclohexane (a concentration of 20% by weight) was added and then the polymerization was conducted at 70° C. for one hour. Moreover, a solution containing 31.9 parts by weight of styrene in cyclohexane was added and then the polymerization was conducted at 70° C. for one hour. Thereafter, the Modifier M5 was reacted in an equivalent molar amount to that of the n-butyl lithium used for the polymerization. The resulting modified block copolymer had a styrene content of 67% by weight with a proportion of the vinyl bonds in the polybutadiene moiety being 18%.

To the modified block copolymer as obtained above, a hydrogenation catalyst II was added in an amount of 100 ppm as Ti and the hydrogenation reaction was carried out at a temperature of 65° C. under a hydrogen pressure of 0.7 MPa for one hour. Thereafter, methanol was added, then octadecyl-3-(3,5-di-t-butyl-4-hydroxyphenyl)propionate was added as stabilizer in an amount of 0.3 part by weight based on 100 parts by weight of the hydrogenated modified block copolymer. Then the resulting solution of hydrogenated modified block copolymer in cyclohexane was heated to remove the cyclohexane so as to produce a hydrogenated modified block copolymer (Polymer 16). The analysis of the polymer 16 showed the results as shown in Table 2. In this case, the proportion of the unmodified block copolymer included in the Polymer 16 was 30% by weight.

17) Polymer 17

Polyer 17 was prepared in the same procedure as that for Polyer 16, except that the hydrogenation catalyst I was added in an amount of 100 ppm as Ti and the hydrogenation reaction was conducted at a temperature of 65° C. under a hydrogen pressure of 0.7 MPa with a hydrogenation rate being 60%. The properties of Polyer 17 are shown in Table 2.

18) Polymer 18

Into an autoclave equipped with a stirrer and a jacket after it was cleaned, dried and purged with nitrogen, a solution containing 20 parts by weight of a previously purified styrene in cyclohexane (a concentration of 20% by weight) was charged. Then n-butyl lithium was added and after polymerizing at 70° C. for one hour, a solution containing 30 parts by weight of a previously refined butadiene in cyclohexane (a concentration of 20% by weight) was added and then the polymerization was conducted at 70° C. for one hour. Moreover, a solution containing 50 parts by weight of styrene in cyclohexane was added and then the polymerization was effected at 70° C. for one hour. The resulting block copolymer had a styrene content of 70% by weight with a proportion of the vinyl bonds in the polybutadiene moiety being 11%. Moreover, octadecyl-3-(3,5-di-t-butyl-4-hydroxyphenyl)propionate was added as stabilizer in an amount of 0.3 part by weight based on 100 parts by weight of the block copolymer. Then the resulting solution of block copolymer in cyclohexane was heated to remove the cyclohexane so as to produce a block copolymer (Polymer 18). The analysis of the Polymer 18 showed the results as shown in Table 2.

19) Polymer 19

Polyer 19 was prepared in the same procedure as that for Polyer 11, except that the amount of n-butyl lithium was controled to reduce the molecular weight. The properties of Polyer 19 are shown in Table 2.

20) Polymer 20

Polyer 20 was prepared in the same procedure as that for Polyer 19, except that the modifier was not employed. The properties of Polyer 20 are shown in Table 2.

TABLE 2

| Sample No. | Styrene Content (wt. %) | Proportion of Vinyl bonds (%) | Weight Average Molecular Weight (×10,000) | Types of Modifier | Block ratio of styrene homopolmer (%) | Hydrogenation Rate (%) | Proportion of 1,2C=C units (%) |
|---|---|---|---|---|---|---|---|
| Polymer 11 | 28 | 38 | 18 | M5 | 99 | 98 | 0 |
| Polymer 12 | 28 | 38 | 18 | None | 99 | 98 | 0 |
| Polymer 13 | 28 | 38 | 38 | SiCl$_4$ | 99 | 98 | 0 |
| Polymer 14 | 39 | 37 | 40 | M1 | 93 | 98 | 0 |
| Polymer 15 | 34 | 42 | 25 | M4 | 91 | 98 | 0 |
| Polymer 16 | 67 | 18 | 8 | M5 | 91 | 98 | 0 |
| Polymer 17 | 67 | 18 | 8 | M5 | 91 | 60 | 0.5 |
| Polymer 18 | 70 | 11 | 11 | None | 90 | 0 | 12 |
| Polymer 19 | 28 | 38 | 8 | M5 | 99 | 98 | 0 |
| Polymer 20 | 28 | 38 | 8 | None | 99 | 98 | 0 |

Example 1

A solution of Polymer 1 in cyclohexane was mixed with silica A in an amount of 5 parts by weight based on 100 parts by weight of Polymer 1. A part of this mix solution was sampled and left to stand for one day and night. Silica A was still uniformly finely dispersed and little silica was separated to precipitate from the mix solution. Thus it could be confirmed that Polymer 1 and silica A were intimately unified to form a composite condition.

Next, the mix solution of Polymer 1 and silica A was heated to remove the cyclohexane so as to produce a block copolymer composition. The physical properties of the resulting composition are shown in Table 3.

Comparative Example 1

Similarly to Example 1, to a solution of Polymer 2, silica A was added to produce a mixture. A part of this solution was sampled and left to stand for one day and night. As a result, the silica A was precipitated and no composite condition as in Example 1 could be developed.

Next, the mix solution of Polymer 2 and silica A as above was heated to remove the cyclohexane so as to produce a block copolymer composition. The physical properties of the resulting composition are shown in Table 3.

Comparative Examples 2 and 3

A block copolymer composition having an amount of silica A incorporated lower than the range of the amount in formulation defined in the present invention (Comparative Example 2), and a block copolymer composition having an amount of silica A incorporated higher than said range (Comparative Example 3) were prepared in the same procedure as in Example 1. The resulting compositions have physical properties as shown in Table 3.

Example 2

A solution of Polymer 3 in cyclohexane was mixed with silica A in an amount of 5 parts by weight based on 100 parts by weight of Polymer 3. A part of this solution was sampled and left to stand for one day and night. Silica A was still uniformly finely dispersed and little silica A was separated to precipitate from the solution. Thus it could be confirmed that Polymer 3 and silica A were intimately unified to form a composite condition.

Next, the mix solution of Polymer 3 and silica A as described above was heated to remove the cyclohexane so as to produce a block copolymer composition. The physical properties of the resulting composition are shown in Table 3.

Moreover, the examination of the abrasion resistance of this composition showed that an abrasion quantity was 14 mg.

Comparative Example 4

Similarly to Example 2, to a solution of Polymer 4 in cyclohexane, silica A was added to produce a mixture. A part of this solution was sampled and left to stand for one day and night. As a result, the silica A was precipitated and no composite condition as in Example 2 could be developed.

Next, the mix solution of Polymer 4 and silica A as above was heated to remove the cyclohexane so as to produce a block copolymer composition. The physical properties of the resulting composition are shown in Table 3.

Moreover, the examination of the abrasion resistance of this composition showed that an abrasion quantity was 25 mg.

Example 3

100 parts by weight of Polymer 5 and 30 parts by weight of silica B were mixed in a twin screw extruder with two screws of a L/D 34 and 30 mm φ rotating in the same direction to produce a block copolymer composition. The extruder was operated at an extrusion temperature of 210° C., and a revolution of 200 rpm. The resulting composition had a haze of 55%.

Comparative Example 5

With Polymer 6, a block copolymer composition was obtained in the same procedure as in Example 3. The resulting composition had a haze of 80% so that it was inferior in transparency to the composition of Example 3.

Example 4

A solution of Polymer 7 in cyclohexane was mixed with silica B in an amount of 5 parts by weight based on 100 parts by weight of Polymer 7. A part of this solution was sampled and left to stand for one day and night. Silica B was still uniformly finely dispersed and little silica B was separated to precipitate from the solution. Thus it could be confirmed that Polymer 7 and silica B were intimately unified to form a composite condition.

Example 5

A solution of Polymer 8 in cyclohexane was mixed with silica C in an amount of 10 parts by weight based on 100 parts by weight of Polymer 8. A part of this solution was sampled and left to stand for one day and night. Silica C was still uniformly finely dispersed and little silica C was separated to precipitate from the solution. Thus it could be confirmed that Polymer 8 and silica C were intimately unified to form a composite condition.

Example 6

A solution of Polymer 9 in cyclohexane was mixed with silica A in an amount of 20 parts by weight based on 100 parts by weight of Polymer 9. A part of this solution was sampled and left to stand for one day and night. Silica A was still uniformly finely dispersed and little silica A was separated to precipitate from the solution. Thus it could be confirmed that Polymer 9 and silica A were intimately unified to form a composite condition.

Example 7

A solution of Polymer 10 in cyclohexane was mixed with silica A in an amount of 5 parts by weight based on 100 parts by weight of Polymer 10. A part of this solution was sampled and left to stand for one day and night. Silica A was still uniformly finely dispersed and little silica A was separated to precipitate from the solution. Thus it could be confirmed that Polymer 10 and silica A were intimately unified to form a composite condition.

silica B was incorporated in an amount of 80 parts by weight. The physical properties of the resulting compositions are shown in Table 4.

Comparative Example 8

Block copolymer compositions were produced in the same procedure as that in Example 8 by using Polymer 12. The physical properties of the resulting compositions are shown in Table 4.

Comparative Example 9

Block copolymer compositions were produced in the same procedure as that in Example 8 by using Polymer 13. The physical properties of the resulting compositions are shown in Table 4.

Example 10

100 parts by weight of Polymer 14 and 100 parts by weight of a rubber softening agent (PW-380) were melt-kneaded in a twin screw extruder with screws of 30 mm φ at 230° C. Thereafter the silica A in an amount of 15 parts by weight as the component (2), a polypropylene resin in an

TABLE 3

| | Components of Composition | | | | Physical Properties of Composition | | |
|---|---|---|---|---|---|---|---|
| | Component (1) | | Component (2) | | Transparency | Heat resistance | |
| | Type | Content (wt. parts) | Type | Content (wt. parts) | Haze (%) | Δ Inflection Temp. (° C.) | processability |
| Example 1 | Polymer 1 | 100 | Silica A | 5 | 45 | 175 | ○ |
| Comp. Example 1 | Polymer 2 | 100 | Silica A | 5 | 77 | 130 | ○ |
| Comp. Example 2 | Polymer 1 | 100 | Silica A | 0.1 | 5 | 100 | ○ |
| Comp. Example 3 | Polymer 1 | 100 | Silica A | 60 | not producing good shapes | | X |
| Example 2 | Polymer 3 | 100 | Silica A | 5 | 43 | 160 | ○ |
| Comp. Example 4 | Polymer 4 | 100 | Silica A | 5 | 75 | 125 | ○ |

Examples 8 and 9

100 parts by weight of Polymer 11 and a rubber softening agent (PW-380) were melt-kneaded in a twin screw extruder with screws of 30 mm c at 230° C. and at compositions as shown in Table 4. Thereafter the silica A or C in an amount indicated in Table 4 as the component (2), a polypropylene resin in an amount indicated in Table 4 as the component (3), and 0.88 part by weight of octadecyl-3-(3,5-di-t-butyl-4-hydroxyphenyl)propionate as stabilizer were added. The resulting mixture was melt-kneaded in a twin screw extruder with screws of 25 mm φ at 230° C. to produce block copolymer compositions. The physical properties of the resulting compositions are shown in Table 4.

Comparative Example 6

Block copolymer compositions were produced in the same procedure as that in Examples 8 and 9, except that no silica was incorporated. The physical properties of the resulting compositions are shown in Table 4.

Comparative Example 7

Block copolymer compositions were produced in the same procedure as that in Examples 8 and 9, except that amount of 34 parts by weight as the component (3), and 0.88 part by weight of octadecyl-3-(3,5-di-t-butyl-4-hydroxyphenyl)propionate as stabilizer were added. The resulting mixture was melt-kneaded in a twin screw extruder with screws of 25 mm φ at 230° C. to produce a block copolymer composition. The physical properties of the resulting composition are shown in Table 4.

Example 11

100 parts by weight of Polymer 15 and 100 parts by weight of a rubber softening agent (PW-380) were melt-kneaded in a twin screw extruder with screws of 30 mm φ at 230° C. to produce a mixture. Thereafter, to the mixture, the silica A in an amount of 15 parts by weight as the component (2), a polypropylene resin in an amount of 34 parts by weight as the component (3), and 0.88 part by weight of octadecyl-3-(3,5-di-t-butyl-4-hydroxyphenyl)propionate as stabilizer were added, and the whole was melt-kneaded in a twin screw extruder with screws of 25 mm φ at 230° C. to produce a block copolymer composition. The physical properties of the resulting composition are shown in Table 4.

TABLE 4

|  |  | Ex. 8 | Ex. 9 | Ex. 10 | Ex. 11 | Comp. Ex. 6 | Comp. Ex. 7 | Comp. Ex. 8 | Comp. Ex. 9 |
|---|---|---|---|---|---|---|---|---|---|
| Composition (parts by Weight) | Polymer 11 | 100 | 100 | — | — | 100 | 100 | — | — |
|  | Polymer 12 | — | — | — | — | — | — | 100 | — |
|  | Polymer 13 | — | — | — | — | — | — | — | 100 |
|  | Polymer 14 | — | — | 100 | — | — | — | — | — |
|  | Polymer 15 | — | — | — | 100 | — | — | — | — |
|  | Silica A | 15 | — | 15 | 15 | — | — | 15 | 15 |
|  | Silica B | — | — | — | — | — | 80 | — | — |
|  | Silica C | — | 50 | — | — | — | — | — | — |
|  | Polypropylene | 34 | 30 | 34 | 34 | 34 | 26 | 34 | 34 |
|  | Rubber Softening Agent | 100 | 136 | 100 | 100 | 88 | 165 | 100 | 100 |
| Hardness (JIS A) |  | 62 | 59 | 63 | 63 | 63 | 59 | 62 | 63 |
| Permanent Compression Set (%) |  | 29 | 26 | 28 | 29 | 37 | 27 | 35 | 35 |
| Tensile Break Strength (MPa) |  | 13 | 8 | 14 | 14 | 13 | 6 | 15 | 15 |
| Processability |  | ○ | ○ | ○ | ○ | ○ | X | ○ | X |
| Average particle size in a dispersion of fillers (μm) |  | 0.2 | 0.2 | 0.1 | 0.2 | 0.3 | 0.4 | 0.4 | 0.4 |

Examples 12 and 13

100 parts by weight of Polymer 11 and 100 parts by weight of a rubber softening agent (PW-380) were melt-kneaded in a twin screw extruder with screws of 30 mm φ at 230° C. Thereafter the silica 2 in an amount of shown in Table 5 as the component (2), a polypropylene resin in an amount shown in Table 5 as the component (3), 3 parts by weight of polystyrene resin, 7 parts by weight of a polyphenylene ether resin, and 0.88 part by weight of octadecyl-3-(3,5-di-t-butyl-4-hydroxyphenyl)propionate as stabilizer were added. The resulting mixture was melt-kneaded in a twin screw extruder with screws of 25 mm φ at 270° C. to produce a block copolymer composition. The physical properties of the resulting composition are shown in Table 5.

Comparative Example 10

A block copolymer composition was produced in the same procedure as that in Example 12, except that Polymer 12 was used. The physical properties of the resulting composition are shown in Table 5.

Comparative Example 11

A block copolymer composition was produced in the same procedure as that in Example 12 using Polymer 18. The physical properties of the resulting composition are shown in Table 5.

TABLE 5

|  |  | Ex. 12 | Ex. 13 | Comp. Ex. 10 | Comp. Ex. 11 |
|---|---|---|---|---|---|
| Composition (parts by weight) | Polymer 11 | 100 | 100 | — | — |
|  | Polymer 12 | — | — | 100 | — |
|  | Polymer 18 | — | — | — | 100 |
|  | Silica B | 15 | 40 | 15 | 15 |
|  | Polypropylene | 34 | 30 | 34 | 34 |
|  | Rubber Softening Agent | 100 | 136 | 100 | 100 |
|  | Polystyrene | 3 | 3 | 3 | 3 |
|  | Polyphenylene ether | 7 | 7 | 7 | 7 |
| Hardness (JIS A) |  | 62 | 60 | 62 | Gellation & decomposition |
| Permanent Compression Set (%) |  | 30 | 26 | 37 |  |
| Average particle size in a dispersion of fillers (μm) |  | 0.3 | 0.2 | 0.3 |  |

Examples 14

100 parts by weight of Polymer 16, 10 parts by weight of silica A as the component (2), 271 parts by weight of polypropylene resin and 834 parts by weight of polystyrene resin as the component (3), and 0.88 part by weight of octadecyl-3-(3,5-di-t-butyl-4-hydroxyphenyl)propionate as stabilizer were added and the resulting mixture was melt-kneaded in a twin screw extruder with screws of 25 mm φ at 230° C. to produce a block copolymer composition. The physical properties of the resulting composition are shown in Table 6.

Example 15

A block copolymer composition was produced in the same procedure as that in Example 14 using Polymer 17. The physical properties of the resulting composition are shown in Table 6.

Comparative Example 12

A block copolymer composition was produced in the same procedure as that in Example 15, except that the silica was not used. The physical properties of the resulting composition are shown in Table 6.

Comparative Example 13

A block copolymer composition was produced in the same procedure as that in Example 15, except that Polymer 18 was used, but the silica was not used. The physical properties of the resulting composition are shown in Table 6.

TABLE 6

|  |  | Ex. 14 | Ex. 15 | Comp. Ex. 12 | Comp. Ex. 13 |
|---|---|---|---|---|---|
| Composition (parts by weight) | Polymer 16 | 100 | — | — | — |
|  | Polymer 17 | — | 100 | 100 | — |
|  | Polymer 18 | — | — | — | 100 |
|  | Silica A | 10 | 10 | — | — |
|  | Polypropylene | 271 | 271 | 271 | 271 |
|  | Polystyrene | 834 | 834 | 834 | 834 |
| flexural strength (MPa) |  | 82 | 82 | 73 | 71 |
| Izod impact strength (J/m) |  | 157 | 158 | 149 | 149 |

Examples 16

100 parts by weight of Polymer 19, 10 parts by weight of silica C as the component (2), and 0.88 part by weight of octadecyl-3-(3,5-di-t-butyl-4-hydroxyphenyl)propionate as stabilizer were added and the resulting mixture was melt-kneaded in a twin screw extruder with screws of 25 mm φ at 220° C. to produce a block copolymer composition. The physical properties of the resulting composition are shown in Table 7.

Example 17

A block copolymer composition was produced in the same procedure as that in Example 16, except that Si69 was incorporated in an amount of 10% by weight based on the silica C. The physical properties of the resulting composition are shown in Table 7.

Comparative Example 14

A block copolymer composition was produced in the same procedure as that in Example 16 using Polymer 20. The physical properties of the resulting composition are shown in Table 7.

Comparative Example 15

A block copolymer composition was produced in the same procedure as that in Example 17 using Polymer 20. The physical properties of the resulting composition are shown in Table 7.

TABLE 7

|  |  | Ex. 16 | Ex. 17 | Comp. Ex. 14 | Comp. Ex. 15 |
|---|---|---|---|---|---|
| Composition | Polymer 19 (parts by weight) | 100 | 100 | — | — |
|  | Polymer 20 (parts by weight) | — | — | 100 | 100 |
|  | Silica C (parts by weight) | 10 | 10 | 10 | 10 |
|  | Si69 (% by weight/silica) | — | 10 | — | 10 |
| Tensile strength (MPa) |  | 28 | 32 | 17 | 17 |
| Tensile elongation (%) |  | 590 | 590 | 610 | 610 |

From the results of Examples 1 to 17 and Comparative Examples 1 to 15 as described above, it can be seen that the block copolymer composition of the present invention is excellent in heat resistance, mechanical strength, transparency, abrasion resistance, and processability and that the block copolymer composition having further an olefinic polymer incorporated is excellent in mechanical strength, permanent compression set, impact resistance, and processability.

Industrial Applicability

The modified block copolymer composition of the present invention comprising specific amounts of (1) a specifically structured modified block copolymer containing specific functional groups or the hydrogenation products thereof and (2) at least one of fillers selected from the group consisting of silica-based inorganic fillers, metal oxides, and metal hydroxides is excellent in heat resistance, mechanical strength, transparency, abrasion resistance, and processability. Moreover, incorporating an olefinic polymer into the composition as above can further improve the mechanical strength, permanent compression set, impact resistance, and processability.

By making use of the characteristics as described above, the modified block copolymer composition of the present invention allows for processing into various shaped articles by injection molding, extrusion molding and the like. Thus, it can be used for automobile parts, domestic electrical appliances, wire covers, medical parts, footwears, miscellaneous goods, and the like.

The invention claimed is:

1. A modified block copolymer composition comprising:
(1) a modified block copolymer consisting of a polymer block A comprising primarily a vinyl aromatic hydrocarbon and a polymer block B comprising primarily a conjugated diene, or a hydrogenation product of the copolymer, and
(2) at least one of fillers selected from the group consisting of silica-based inorganic fillers, metal oxides and metal hydroxides,
wherein the molecular chain of the component (1) has at the terminals thereof a functional group having at least one group selected from the group consisting of a hydroxide group, an epoxy group, an amino group, a silanol group, and an alkoxysilane group; the component (1) has a content of the vinyl aromatic hydrocarbon of 5 to 95% by weight; the amount of the component (2) is 0.5 to 50 parts by weight based on 100 parts by weight of the component (1); and the component (2) has an average particle size in a dispersion of 0.01 to 0.3 μm.

2. The modified block copolymer composition according to claim 1, further comprising (3) an olefinic polymer, the amount of the component (3) being 10 to 500 parts by weight based on 100 parts by weight of the component (1).

3. The modified block copolymer composition according to claim 1 or 2, wherein the block ratio of the vinyl aromatic hydrocarbons is not less than 50% of the whole vinyl aromatic hydrocarbons in the component (1).

4. The modified block copolymer composition according to claim 1 or 2, wherein the component (1) is a hydrogenation product of the modified block copolymer, the hydrogenation rate of which is not less than 10%, and the proportion of a structural unit having a vinyl bond to the whole structural units originated from the conjugated dienes in the hydrogenated product being in the range of 10 to 85%, and the proportion of a 1,2C═C unit is not higher than 15%.

5. The modified block copolymer composition according to claim 1 or 2, wherein the molecular chain of the component (1) has at the terminals thereof a functional group selected from the group consisting of the groups having the following formulae (1) to (14):

-continued

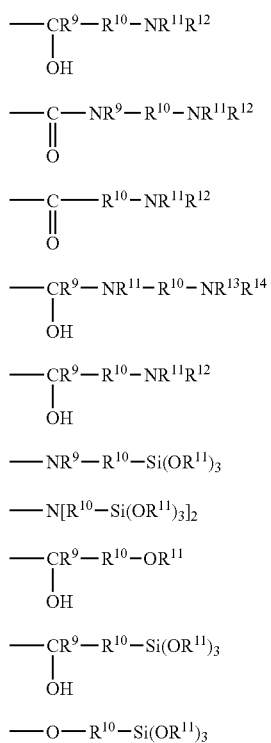

where
R⁹, R¹² to R¹⁴ are a hydrogen, a hydrocarbon group having carbon atoms of 1 to 24, or a hydrocarbon group having a functional group selected from the group consisting of a hydroxide group, an epoxy group, a silanol group, and an alkoxysilane group and having carbon atoms of 1 to 24;

R¹⁰ is a hydrocarbon chain having carbon atoms of 1 to 30, or a hydrocarbon chain having a functional group selected from the group consisting of a hydroxide group, an epoxy group, a silanol group, and an alkoxysilane group and having carbon atoms of 1 to 30;

hydrocarbon groups R⁹, R¹² to R¹⁴ and a hydrocarbon chain R¹⁰ may have an element such as oxygen, nitrogen or silicon bonded in the bonding form other than the hydroxide group, the epoxy group, the silanol group, and the alkoxysilane group; and R¹¹ is a hydrogen or an alkyl group having carbon atoms of 1 to 8.

6. The modified block copolymer composition according to claim 1 or 2, wherein the molecular chain of the component (1) has at the terminals thereof a functional group selected from the group consisting of the groups having the following formulae (1) to (9):

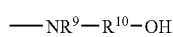 (1)

 (2)

-continued

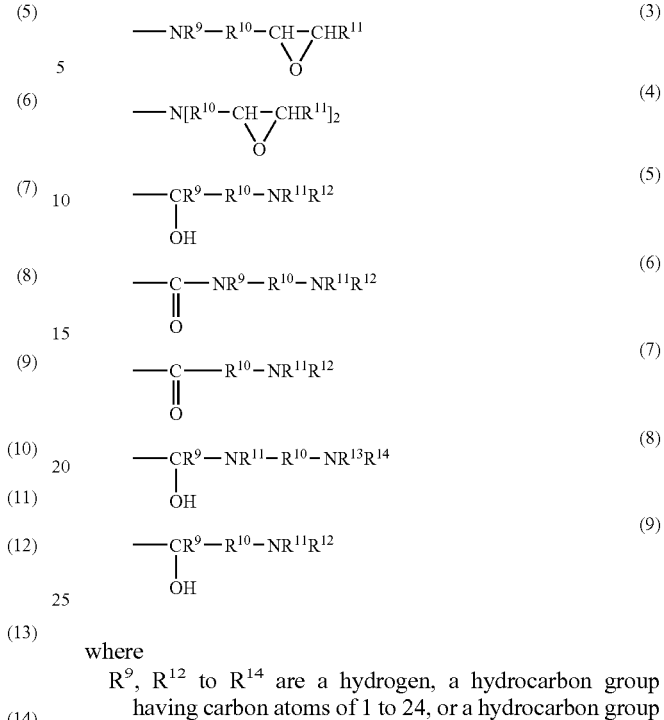

where
R⁹, R¹² to R¹⁴ are a hydrogen, a hydrocarbon group having carbon atoms of 1 to 24, or a hydrocarbon group having a functional group selected from the group consisting of a hydroxide group, an epoxy group, a silanol group, and an alkoxysilane group and having carbon atoms of 1 to 24;

R¹⁰ is a hydrocarbon chain having carbon atoms of 1 to 30, or a hydrocarbon chain having a functional group selected from the group consisting of a hydroxide group, an epoxy group, a silanol group, and an alkoxysilane group and having carbon atoms of 1 to 30;

hydrocarbon groups R⁹, R¹² to R¹⁴ and a hydrocarbon chain R¹⁰ may have an element such as oxygen, nitrogen or silicon bonded in the bonding form other than the hydroxide group, the epoxy group, the silanol group, and the alkoxysilane group; and R¹¹ is a hydrogen or an alkyl group having carbon atoms of 1 to 8.

7. The modified block copolymer composition according to claim 1 or 2, wherein the component (2) is at least one of fillers selected from the group consisting of silica, wollastonite, montmorillonite, zeolites, alumina, titanium oxide, magnesium oxide, zinc oxide, slag wool, magnesium hydroxide, aluminum hydroxide, hydrated magnesium silicate, hydrated aluminum silicate, basic magnesium carbonate, and hydrotalcite.

8. The modified block copolymer composition according to claim 1 or 2, containing a silane coupling agent in an amount of 0.1 to 20% by weight based on the amount of the component (2).

9. The modified block copolymer composition according to claim 7, wherein the silica is a glass fiber.

10. The modified block copolymer composition according to claim 7, wherein the filler is a particulate filler.

\* \* \* \* \*